Nov. 21, 1944.    L. G. DANIELS    2,363,167
WATER TREATMENT APPARATUS
Original Filed April 26, 1937    4 Sheets-Sheet 1
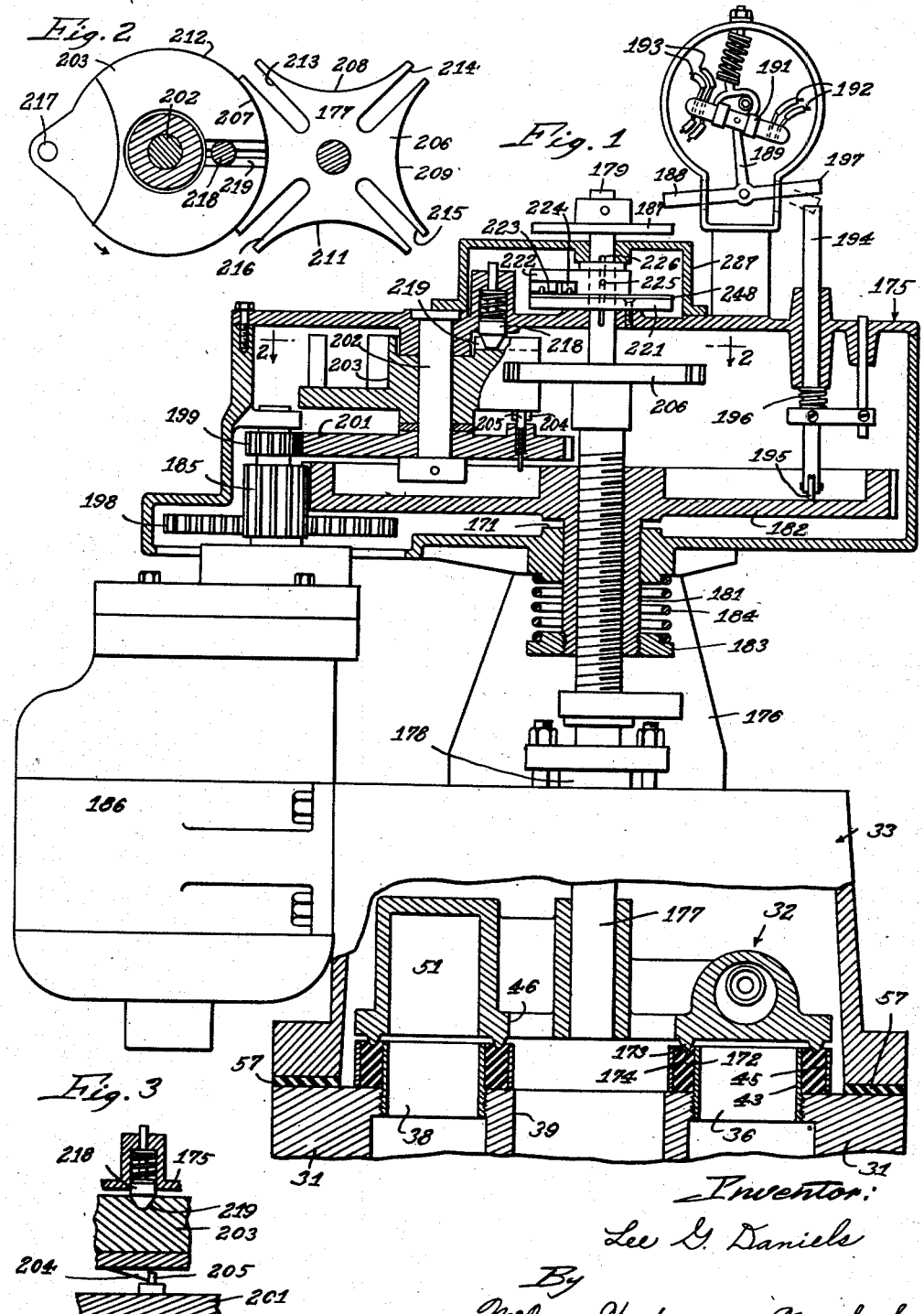
Inventor:
Lee G. Daniels
By McCanna, Wintercorn & Marsbach
Attys.

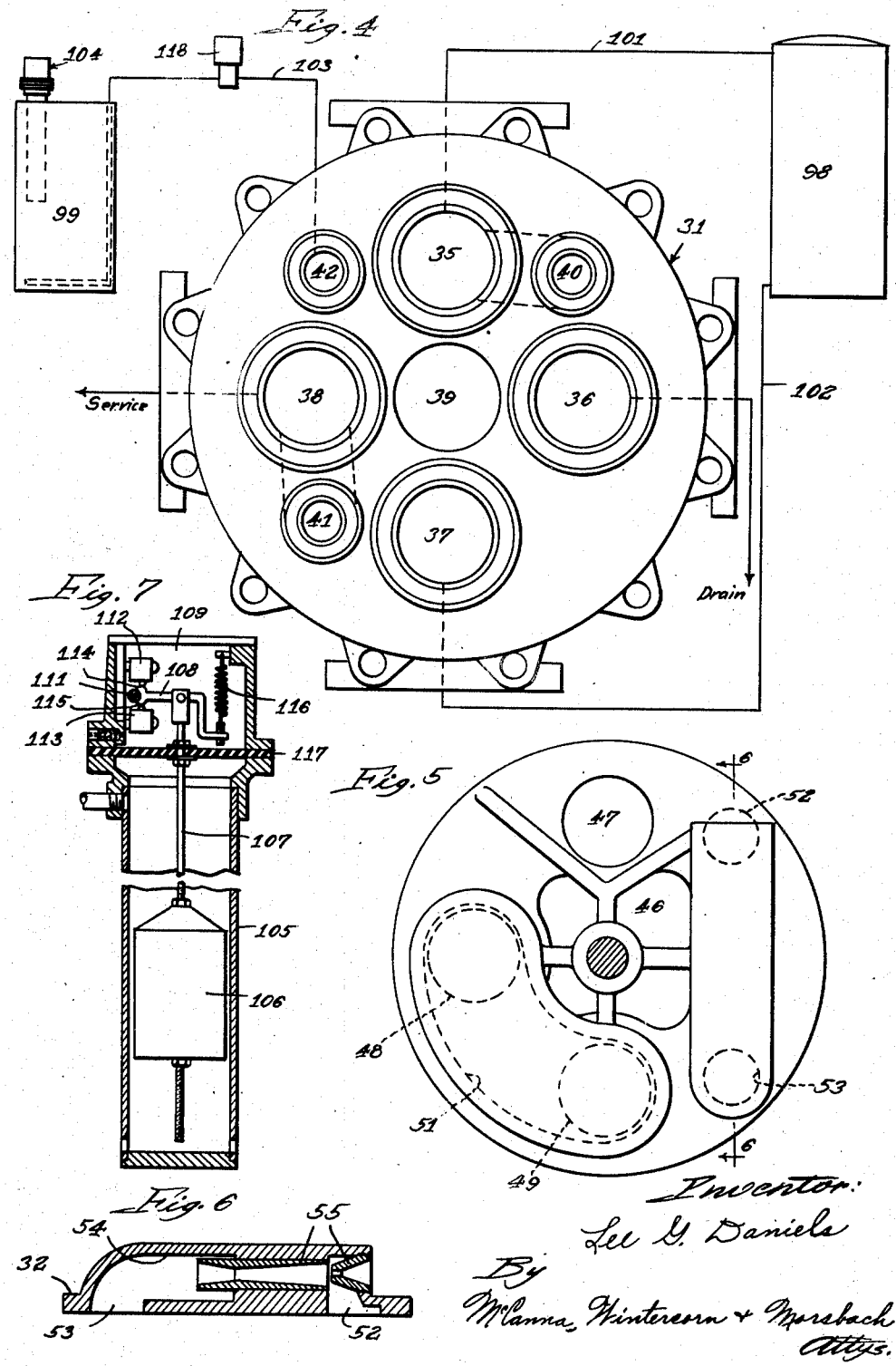

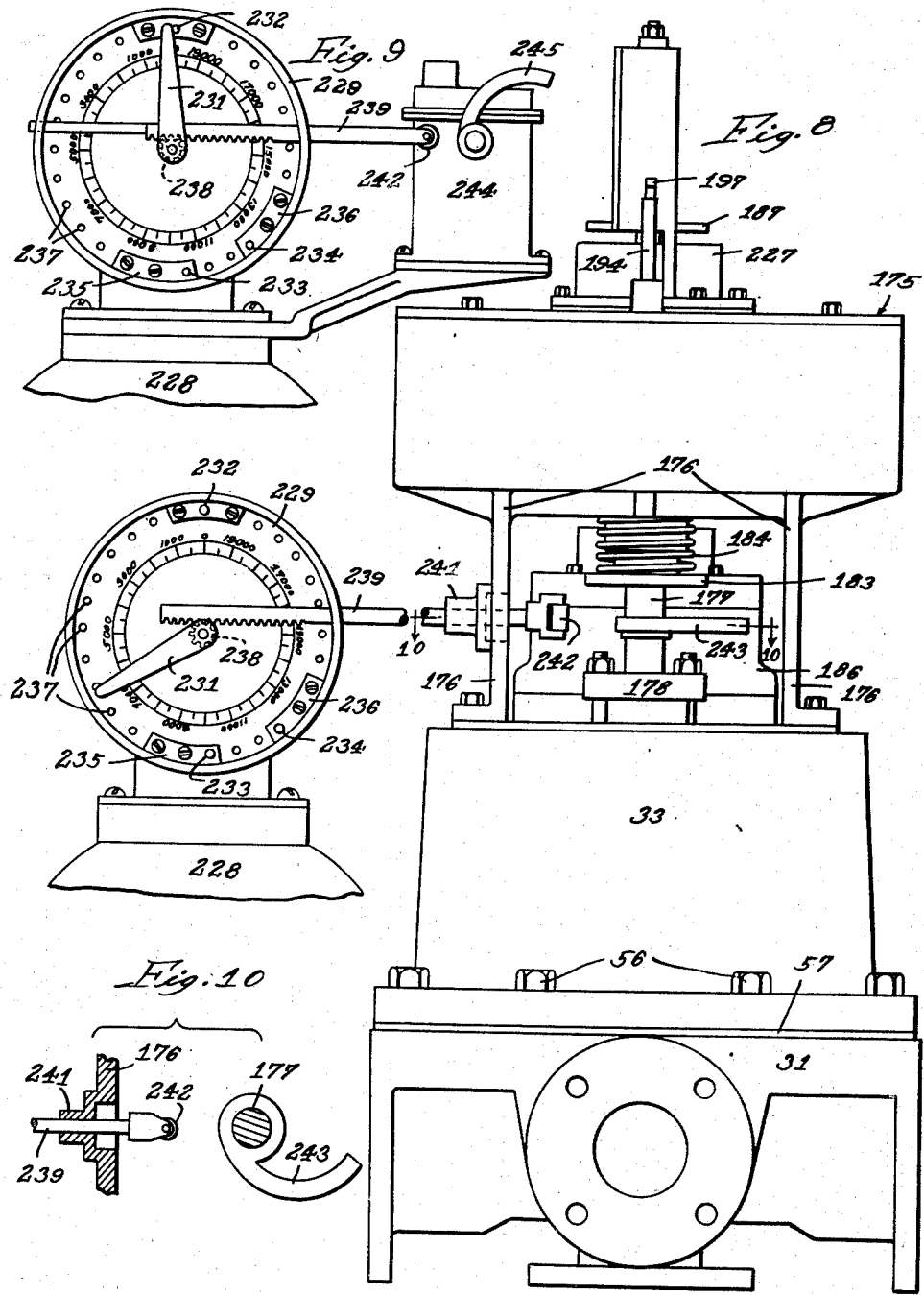

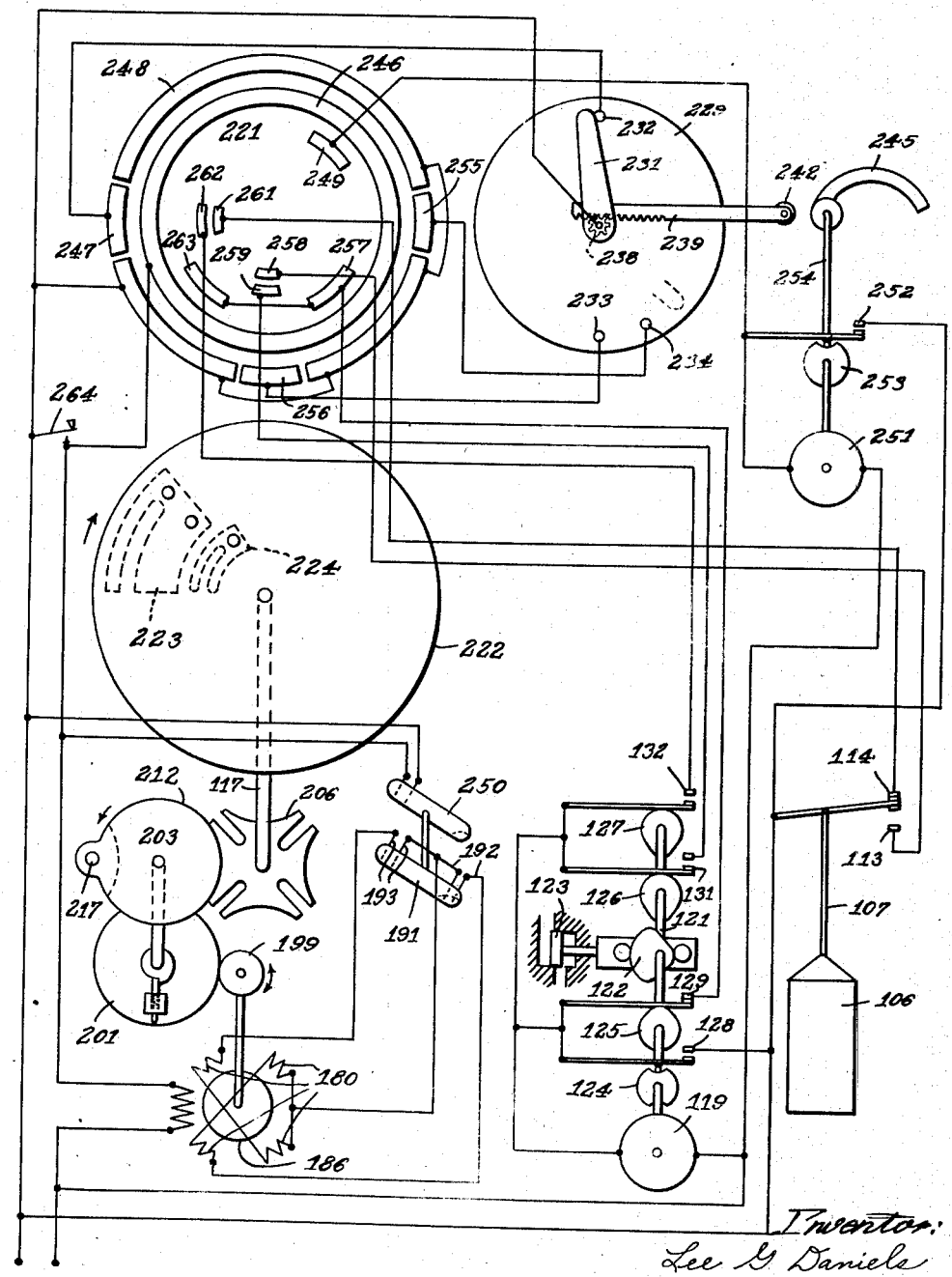

Patented Nov. 21, 1944

2,363,167

UNITED STATES PATENT OFFICE 2,363,167

WATER TREATMENT APPARATUS

Lee G. Daniels, Rockford, Ill.

Original application April 26, 1937, Serial No. 138,948. Divided and this application February 8, 1941, Serial No. 377,953

9 Claims. (Cl. 210—24)

This invention relates to water treatment apparatus and more particularly to means for controlling the same to perform the steps of reconditioning or regeneration.

An important object of the invention is the provision of a water treatment apparatus having improved means for controlling the flow of liquid therethrough, including improved means for controlling the steps of reconditioning the device, such as regenerating a zeolite water softener.

A further object of the invention is the provision of a water treatment device having a unitary multiple port valve, and improved means for driving the same through the steps of a reconditioning cycle including a novel form of meter control mechanism.

Other objects and advantages will be apparent from the following description and the accompanying drawings, in which—

Figure 1 is a section through a motor operated valve embodying my invention;

Fig. 2 is a view on the line 2—2 of Figure 1;

Fig. 3 is a fragmentary section showing the driving section for the Geneva movement;

Fig. 4 is a face view of the valve body member showing diagrammatically the connection of a water treatment device therewith;

Fig. 5 is a top view of the valve rotor member;

Fig. 6 is a section on the line 6—6 of Fig. 5;

Fig. 7 is a section through the brine level control mechanism of Fig. 4;

Fig. 8 is an elevation of the motor operated valve showing mechanical means for resetting the meter;

Fig. 9 is an elevation of a portion of the valve control mechanism showing electrical means for resetting the meter;

Fig. 10 is a section on the line 10—10 of Fig. 8, and

Fig. 11 is a wiring diagram embodying the invention.

Directing attention first to the structure of the valve per se, the numeral 31 designates the body or stator member of the valve, and the numeral 32 designates the rotor member or plate thereof, the numeral 33 designates the valve housing or cover, and the numeral 177 designates the stem by which the rotor or stem member of the valve is raised and indexed between its various positions, the valve herein shown being adapted for use with the stem in horizontal position.

The valve body 31 has a plurality of ports designated by the numerals 35—42, respectively (Fig. 4) extending through the face of the body. Means are provided for sealing the junction between the rotor and body members at each of the ports comprising a sleeve 43, in this instance threaded into the port and projecting above the face of the body member. Encircling the sleeve 43 is a relatively thick cylinder of rubber or similar resilient material 172 having a substantially plane end surface. The rubber cylinder or gasket is in turn encircled by a retaining member 45, one end of which seats against the face of the body member, the gasket being confined between the sleeve 43 and the retaining member 45 to prevent lateral distortion thereof under the seating pressure. The rotor 32 is provided with annular ribs around the ports as shown at 173 having arcuate lower edges 174 arranged to press into and seal against the outer end of the cylinder gaskets 172 and be depressed therein as shown in Figure 1 under the pressure applied to the rotor by the rotor stem. The ports 35 and 40 and the ports 38 and 41 are interconnected within the body of the valve as shown in dotted lines in Fig. 4.

The stem plate or rotor member 32 has a central port 46 for communication between the port 39 and the valve chamber formed by the cover 33. The stem plate also has a port 47 for registration with certain of the stator ports, ports 48 and 49 interconnected by a channel 51, and ports 52 and 53 interconnected by a channel 54 (Fig. 6) in which are positioned injector tubes 55 communicating with the valve chamber.

The cover 33 is attached to the stator or body member by means of cap screws 56 (Fig. 8) spaced around the valve, a gasket 57 being interposed between the cover and body to prevent leakage. A casing, designated generally by the numeral 175, is carried on the end of the cover 33 through brackets 176, and a rotor stem 177 for lifting, turning and reseating the rotor is fixed to the rotor 32 projecting through a packing gland 178 on the cover 33 and into the casing 175, the remote end 179 thereof being of smaller diameter and projecting through and beyond the casing 175. The rotor stem 177 is externally threaded for the reception of the internally threaded hub 181 of a gear 182 carried in the casing 175 for rotation and for longitudinal movement. A nut 183 is secured on the remote end of the hub 181 and a coiled spring 184 is interposed between the casing and the nut 183. The gear 182 is adapted to be rotated from a pinion 185 driven by reduction gearing from a motor 186 carried on the cover 33 of the valve. In the position shown in Figure 1, the spring 184 is acting to exert pressure between the valve rotor and its seat formed by the resilient gaskets 172. However, upon rotation of the gear 182 in one direction, the sleeve 181 and gear 182 will move downward on the stem until the lower face of the gear engages the casing 171, thus releasing the pressure of the spring 184 from the rotor. Upon continued rotation of the gear, the stem will move upward in the sleeve 181, causing the rotor to be lifted free of its seat. The motor 186 is a reversing motor of well known form, and through reversal of the motor by proper changes in the connections of shading coils 180, as will presently be described, the gear 182 may be driven in the opposite direction, whereupon the rotor will be brought into contact with its seat and, upon continued rotation the gear 182 and hub 181 will move up along the stem so as to compress the spring 184 and thus apply pre-loaded pressure on the rotor constantly urging it against its seats.

The pinion gear 185 is of sufficient length to permit of the described axial movement of the gear 182. Through this means the rotor is lifted from its seat, rotated or indexed to its next position, and returned to its seat and pre-loaded pressure applied thereto.

Reversal of the direction of the motor 186 is accomplished through a disk 187 attached to the upper end of the valve stem and positioned to engage an end 188 of a switch lever 189, thereby shifting the lever into the dotted line position shown in Figure 1 and tilting a mercury tube 191 so as to break contact with leads 192 and make contacts with leads 193, as will appear from Fig. 11. Operation of the motor 186 in a direction to seat the valve rotor to apply pressure is terminated through action of a push member 194 supported in the casing 175 for longitudinal movement and carrying a follower 195 urged against the face of the gear 182 by a spring 196. Thus as the gear 182 rises in applying pressure between the rotor and its seat, the push member 194 moves upward into contact with an end 197 of the lever 189, shifting the lever into the position shown in full lines in Figure 1 and tilting the mercury switch 191 to close contacts 192. The motor does not start, however, because the motor is de-energized by means presently to be described.

Means are provided within the casing 175 for indexing the rotor during its movement from the unseated position to the seated position. That is, the valve rotor is first lifted from its seat, then unlocked, then indexed or rotated to its next position, then locked against rotation, and then reseated. This means includes a gear 198 driven from the pinion 185, the gear being carried on a shaft which also carries a pinion 199 which in turn meshes with a gear 201 rotatably carried on a shaft 202. Also carried on the shaft 202 is the driving member 203 of a Geneva movement. The member 203 has a cam 204 on the surface thereof adjacent the gear 201, while the gear carries a spring pressed pin 205 adapted to bear against the surface of the member 203 so that upon rotation of the gear 201 in one direction the pin will ratchet by the cam 204, while upon rotation of the gear 201 in the opposite direction the pin will abut the cam 204 and cause rotation of the member 203.

The second member 206 of the Geneva movement is fixed to the valve stem 177 and cooperates with the driving member 203 to effectuate indexing of the valve stem and rotor member through 90° upon each rotation of the driving member 203. The driven member 206 has the conventional cam surfaces 207, 208, 209 and 211 arranged to cooperate with an arcuate surface 212 on the driving member, and has slots 213, 214, 215 and 216 positioned at 90° angles adapted to cooperate with a pin 217 on the driving member in the usual manner. A spring pressed pin 218 is carried in the casing 175 and urged into a slot 219 of the driving member to prevent rotation thereof, as a result of frictional drag between the gear 201 and the Geneva movement when the gear is rotated in the ratcheting direction. The pin 218 is forced out of its locking slot 219 when pin 205 engages the flat surface of cam 204.

It will thus be seen that as the valve stem 177 is raised through rotation of the gear 182, the gear 201 will move in a direction to ratchet over the cam 204, whereas when the direction of the motor is reversed and the valve stem is moved downward, the pin 205 will engage the cam 204 causing the valve stem and plate to be indexed through 90° during such downward movement. The parts are so arranged that indexing of the rotor occurs substantially at the start of such downward movement. A disk 221 of insulation material is positioned on the outer face of the casing 175 surrounding the stem 177 and carries contact segments presently to be described for the purpose of controlling operation of the valve. Supported adjacent the disk is a brush carrier 222 adapted to carry brushes 223 and 224 in positions to engage the segments on the disk. The carrier is attached to the stem 177 by means of a pin 225 which passes through a slot 226 in the valve stem to permit of longitudinal movement of the stem without disturbing the contacts, but to cause rotation of the brush carrier. The switch mechanism comprising the elements just described is enclosed by a housing 227.

From the foregoing it will be seen that the Geneva movement serves to hold the valve rotor locked against rotation when it is in its normal operating position so that there will be no scoring of the gaskets by relative rotary movement of rotor and stator. The Geneva movement maintains this relationship until the valve rotor has been lifted clear of the stator when indexing. The indexing is performed by the Geneva movement. Upon completion of the indexing operation the valve rotor is locked against rotation from its new position by the Geneva movement.

In Figs. 4-11, I have shown the elements of a water treatment device, in this instance a zeolite water softener, together with means for controlling the valve to move the same through the steps of regeneration and return to softening. It will be understood that by obvious modifications in the construction in accordance with and carrying forth the teachings herein disclosed, the control mechanism may equally be utilized for filters and liquid distributors. In Fig. 4 the numeral 98 designates the softening tank of a conventional zeolite softener, the numeral 99 a brine tank thereof, the numeral 101 a water line leading from the valve to the top of the softener, the numeral 102 a conduit for soft water flowing from the bottom of the softener to the valve, and the numeral 103 a line leading from the brine tank to the valve. The port 39 is connected to a source of hard water supply, and the ports 36 and 38 to drain and service, respectively, in accordance with conventional practice.

Positioned in the brine tank 99 is a brine level control designated generally by the numeral 104 and shown in greater detail in Fig. 7. This consists of a tube 105 suspended in the brine tank and serving as a guide for a float 106 carried on a rod 107 attached to a lever 108 in a switch chamber 109, the lever being articulated at 111 between switches 112 and 113 arranged to be actuated by cams 114 and 115 on the lever in such manner that one of the switches will be actuated when the float reaches the upward limit of its level and the other switch will be actuated when the float reaches its lower limit. A spring 116 cooperates with the lever 108 to counterbalance in part the weight of the float. The rod 107 passes through a diaphragm or plate 117 separating the switch chamber 109 from the float chamber within the tube 105. Actuation of the switches 112 and 113 serves to limit the withdrawal of brine from the brine tank and the subsequent entry of water through the salt bed to replace the brine withdrawn.

Positioned in the brine line 103 is a motor operated valve and contact mechanism indicated generally by the numeral 118 shown diagrammatically in Fig. 11 and including a motor 119 arranged through suitable gearing to drive a shaft 121 having a cam 122 adapted to actuate the movable member 123 of a valve in the line 103 to open and close the same. The shaft 121 also carries cams 124, 125, 126 and 127 adapted to actuate switches 128, 129, 131 and 132 in a manner which will be plain from Fig. 11.

Initiation of the regeneration cycle is brought about through a meter 228 having a dial 229 provided with a hand 231 adapted to rotate in response to operation of the meter and to engage contacts 232, 233 and 234. Contacts 233 and 234 are carried on plates 235 and 236, the plates and contacts being adjustable circumferentially on the dial by engaging the screws thereof in any of a plurality of screw holes 237. Means are provided for setting the position of the hand 231 so that the valve will be set into operation upon passage of a predetermined amount of water through the meter. For this purpose the hand is connected to the meter through any of a plurality of mechanisms such as a frictional means or ratchet mechanism, and is provided with a pinion 238 adapted to engage a rack 239 such that upon movement of the rack toward the left facing Figs. 8 to 11, the hand will be moved in a counterclockwise direction. Two means are shown for moving the rack, that in Fig. 8 being a mechanical arrangement, and that in Fig. 9 electric motor means. Referring first to Fig. 8, the rack 239 is supported for longitudinal movement in a bearing 241 and has a roller 242 at its end adapted for engagement by a cam 243 carried on the valve stem 177, the arrangement of the parts being such that the cam actuates the rack prior to the arrival of the valve rotor in its first operative position corresponding to the back-wash on the softened. The contacts 233 and 234 are positioned so that the hand 231 will be thrown in a counterclockwise direction beyond the position thereof.

Where it is impossible or inconvenient to position the meter in such proximity to the valve mechanism that the rack may be actuated mechanically from the valve, I may employ the arrangement shown in Fig. 9, wherein the numeral 244 designates a motor casing having a cam actuated contact therein, as will presently appear, and driving a cam 245 arranged to engage the roller 242 in the manner heretofore described.

Referring now more particularly to Fig. 11, I have shown means for controlling the valve through the steps of regeneration in a water treatment system such as shown in Figs. 4 to 7, inclusive. When, during the operation of the softener, the meter-driven hand 231 reaches the button 232, circuit is closed through the field coils of the motor 186 by way of a contact ring 246 on the disk 221, the brush 223, the contact segment 247 with which the brush is in engagement during the service position of the valve, the contact 232, and the hand 231. When the motor has run sufficient to move the brush 223 off the contact segment 247, it engages a contact segment 248, establishing a new circuit through the motor by way of the segment 248 and the ring 246. Upon energization of the motor 186, the valve rotor will be raised and lowered, in the meantime being indexed 90° in a clockwise direction, the brush 223 simultaneously moving 90° around the disk 221. With the softener arrangement herein shown, the motor will not, however, stop at this position and the rotor will immediately be lifted and again indexed an additional 90°. During the second movement of the brush 223, contact is made with a segment 249, thereby closing a circuit through a motor 251 enclosed in the casing 244 by way of the segment 249, the brush 223 and the segment 248. Upon initial movement of the motor 251, a switch 252 is closed by means of a cam 253 on a shaft 254, which is in turn driven through suitable gearing from the motor 251. The switch 252 connects the motor 251 directly to the power supply and keeps the motor running until the cam 245 has made one complete revolution, thereby moving the rack 239 and re-setting the hand 231 to the dotted line position shown in Fig. 11. In the meantime, the brush 223 comes to rest on a contact segment 255. It will be observed that the gears have completed the indexing of the valve stem 177 and rotor prior to the completion of the rotor seating operation, and consequently the brush 223 has moved onto the contact 255 prior to the seating of the valve. In order to continue operation of the motor 186 until the valve has been seated, I provide a mercury switch 250 arranged to be tilted with the mercury switch 191 to supply current to the motor subsequent to the indexing of the valve, the switch being cut off in response to the stem 194 reaching its uppermost position to stop the motor 186 when the valve reaches its seated position. The switch 250 functions in this manner upon each seating movement of the valve, as will be apparent from Figs. 1 to 3 and 8 to 11.

At this point water from the source of supply flows through the stator port 37 and through the softener tank in a reverse direction accomplishing a back-washing operation. This back-wash is terminated upon the passage of a predetermined amount of water by contact of the hand 231 with the contact button 234 on the face of the meter which closes the circuit through the valve motor 186 by way of the hand 231, the contact 234, the segment 255, the brush 223, and the contact ring 246, whereupon the valve will be indexed an additional 90°, at the close of which movement the brush 223 will come to rest on a segment 256. During this movement of the valve, the brush 223 will momentarily engage a segment 257 closing the circuit through the brine valve motor 119 by way of the contact 129, the segment 257, the brush 223, and the segment 248. As heretofore explained, upon initial movement of the motor 119, the cam 124 closes the switch 128, causing the motor 119 to rotate the shaft 121 through 180° and then stop. This half rotation of the shaft 121 causes the brine valve 123 to be opened so that when the valve rotor reaches its seated position, brine will be drawn from the brine tank 99 through the line 103 by the injector in a well known manner. As brine is withdrawn from the tank 99, the float 106 is lowered until the switch 113 is closed, which action serves to terminate the injection of brine into the softener tank by energizing the brine valve motor 119 by way of the switch 131, a segment 259, the brush 224, a segment 250, and the switch 113. This serves to close the brine valve 123. Water then flows through the softener tank from the source of supply by way of the valve chamber, tube 55, the channel 54 and port 53. This flow of water through the meter causes continued movement of the hand 231 until the hand engages the contact button 233, whereupon the circuit through the motor 186 is closed by way of the hand 231, the contact button 233, the segment 256, the brush 223 and the ring 246, as a result of which the valve moves to the service position and the brushes 223 and 224 move to a point at which the brush 223 engages the contact segment 247 and the brush 224 engages contact segments 261 and 262. During this movement of the brushes, the brush 223 engages a segment 263 energizing the brine valve motor 119 by way of the contact 129, the segment 263, the brush 223 and the ring 246, opening the brine valve 123 in the manner heretofore described to permit a flow of water through the pipe 103 into the brine tank 99 to replenish the brine supply. When the level of liquid in the brine tank 99 raises the float 106 to a point closing the contact 114, the brine valve motor 119 is again energized by way of the contact 132, the segment 262, the brush 224, the segment 261, and switch 114, whereupon the motor operates to close the brine valve 123, completing the cycle of operation. The meter hand 231 continues to be driven under the action of the meter as water passes through the softener, and when the hand again makes contact with the button 232 regeneration of the softener will again be initiated. A manually operated switch 264 permits initiation of the cycle at will.

This is a division of my copending application Serial No. 138,948, filed April 26, 1937, entitled "Automatic softener valve."

The foregoing description is given for the purpose of disclosing the invention in such manner as to permit the same to be practiced by others, and the specific forms disclose preferred manners for practicing the invention. I am aware that numerous alterations may be made therein within the spirit of the invention, and I do not wish to be limited except as required by the prior art and the scope of the appended claims, in which I claim:

1. The combination in a zeolite water treatment apparatus having a softener tank, a brine tank, piping connecting said tanks having a service water inlet, a soft water outlet, and an outlet to waste, said piping also having a multiple port lift turn valve for controlling the flow therethrough during service and regeneration phases of a cycle of operations, of a meter mechanism comprising a meter, a rotatable member driven by said meter in response to the passage of water therethrough during said cycle, electric circuits having switches operated by said rotatable means, electrical means in said circuits periodically energized by said rotatable member by operation of said switches for actuating said valve means in the regeneration phase of said cycle a rack and pinion for independent rotation of said member in a reverse direction with respect to the meter, and power operated cam means for actuating said rack and pinion during said regeneration phase to reset said meter to a preselected starting point.

2. The combination in a zeolite water softener having a water inlet conduit for supplying water thereto of a meter mechanism operative in the control of regeneration of said softener comprising a meter in said inlet conduit, a dial associated therewith having graduations for indicating the passage of liquid through the meter, a plurality of electrical circuits having contacts, means spaced annularly of the dial for securing said contacts at selected points, a hand movable over said dial in one direction by said meter when water flows to said softener positioned to act as an indicating hand against said dial and as a wiper for closing said circuits through said contacts, a rack and pinion positioned to move said hand in a reverse direction to reset said hand, and means for actuating the rack and pinion in a direction to reverse said hand and reset the same.

3. The combination in a water treatment apparatus of a water treatment tank, a container for regeneration reagent, conduits for confining the flow therethrough through regeneration and service cycles, including conduits for hard water, soft water, brine and waste, a multiple port lift turn control valve for controlling the flow therethrough, a motor for operating said control valve means, a valve disposed in the brine line for controlling the flow of brine to said tank, a brine valve motor for operating said brine valve, circuit means including said motors, a meter disposed in the hard water line to said tank having meter driven switch operating means, switch means operated by the said meter driven means for closing the circuit to said control valve motor upon the passage of a predetermined amount of water therethrough to start regeneration and move said control valve to a back-wash position, means operated upon movement of said control valve for resetting said meter driven means to an initial starting position, switch means operated by said meter driven means after a further movement thereof for closing the circuit to said control valve motor to move said control valve to a brine position, means for closing the circuit to said brine valve motor during the last mentioned movement of said control valve to open the brine valve, means for closing the circuit to said brine valve motor upon movement of the brine level to a predetermined lower level to close the brine valve, switch means operated by said meter driven means after a further movement thereof for closing the circuit to said control valve motor to move said control valve to a service position, means for closing the circuit to said brine valve motor upon movement of said control valve to the service position to open said brine valve to refill the regeneration reagent container, and means for closing the circuit to energize said motorized brine valve motor to close the brine valve when the level of the liquid in said reagent container reaches a predetermined upper level.

4. The combination in a water softener having a softener tank, a brine tank, and means for confining the flow of water and of brine, of a brine valve for controlling the flow of liquid to and from the brine tank, a brine valve motor for driving said brine valve, a multi-port lift turn valve movable through a regeneration cycle, a motor for driving said multi-port valve, a plurality of circuits, and means to control the multi-port valve motor to intermittently drive the multi-port valve through the steps of regeneration comprising means including a switch in one of said circuits for energizing the multi-port valve motor to start the regeneration cycle and move the multi-port valve to a back-wash position, means including a switch in one of said circuits for predetermining a backwash period and energizing the multi-port valve motor at the termination thereof to move the multi-port valve to a brine position, means including a switch in one of said circuits to energize said brine valve motor to open the brine valve for the passage to brine to the softener tank, float means in the brine tank including a switch in one of said circuits for energizing said brine valve motor to close said brine valve at a predetermined level in the brine tank, means including a switch in one of said circuits for predetermining a rinse period subsequent to the closing of said brine valve and for energizing said multi-port valve motor at the termination thereof to move the multi-port valve to a service position, and means including switch means in one of said circuits for energizing said brine valve motor to open said brine valve during the movement of the multi-port valve to said service position to supply water to the brine tank, said float means being arranged to actuate the last mentioned switch means to re-energize the brine valve motor at a predetermined upper level in the brine tank to close said brine valve.

5. The combination in a water softener having a softener tank, a brine tank, and conduit means for confining the flow of water and of brine through said tanks, of a brine valve for controlling the flow of liquid to and from the brine tank, a brine valve motor for operating the same, a multi-port lift turn softener valve movable through a regeneration cycle, a motor for operating said softener valve, and means to control the softener valve motor to intermittently operate the softener valve through the steps of regeneration comprising a meter for measuring the water supplied to the softener having meter driven switch operating means, circuit means including said motor, switch means in said circuit means operative by said meter driven means to energize the softener valve motor to start the regeneration cycle and move the softener valve to a back-wash position, means for resetting said meter driven means, switch means on the meter connected to said circuit means for energizing the softener valve motor upon the passage of a predetermined quantity of back-wash water to move the valve to a brine position, switch means in said circuit means to energize said brine valve motor to open said brine valve for the injection of brine through the softener valve into the softener tank, float means in the brine tank having a switch in said circuit means for energizing the said brine valve motor to close said brine valve at a predetermined level in the brine tank to terminate the flow of brine and rinse the softener tank with the brine free injection water, switch means on said meter and in said circuit means for energizing said softener valve motor upon the passage of a predetermined amount of injection water to move the valve to a service position, and switch means in said circuit means for energizing said brine valve motor to open said brine valve during the movement of the valve to said service position to supply water to the brine tank, said float means being arranged to actuate the last mentioned switch means to re-energize the brine valve motor at a predetermined upper level in the brine tank to close the same.

6. The combination in a water softener having a softener tank, a brine tank, and conduit means for confining the flow of water and of brine through said tanks, of a brine valve for controlling the flow of liquid to and from the brine tank, a brine valve motor for operating said brine valve, float means in the brine tank including a circuit and switch means for energizing said brine valve motor to close said brine valve at predetermined levels of liquid in the tank, a softener valve having a multi-ported body member, a ported rotor member rotatable to different operative positions relative to the body member, and a stem extending from the rotor for unseating, turning and reseating the same, a reversible motor, means operated by the motor operative on said stem to unseat said rotor when the motor rotates in one direction and reseat the rotor upon rotation in the opposite direction, a circuit for said motor, means driven by the motor for rotating the stem and rotor while the rotor is unseated, switch means in said circuit for reversing the motor in the unseated and seated positions of the rotor, switch means in said circuit associated with said stem for energizing said motor comprising a plurality of stationary contact segments and a plurality of brushes operating thereagainst for controlling operation of the said brine valve motor and for energizing said motor through a greater portion of the initial part of its travel, and switch means in said circuit opened and closed in response to seating and unseating of said rotor for energizing the motor during the remainder of its travel.

7. The combination in a zeolite water softening apparatus, of a softener tank, a regeneration reagent tank, piping connecting said tanks having a service water inlet, a soft water outlet, and an outlet to waste, said piping also having a multiple port lift turn valve for controlling the water flowing during service and during the regeneration cycle thereof, motor means for operating said valve, a meter in the inlet conduit, and electrical circuits and switches connecting the meter and said motor for controlling the operation of the motor to drive the valve through a regeneration cycle.

8. The combination in a zeolite water treatment apparatus having an electrically operated lift turn multiple port valve for directing the flows of water during service and the regeneration cycle thereof, of a meter mechanism for controlling said valve means comprising a water meter, a rotatable member driven by said meter in response to the passage of water therethrough, electrical means periodically energized by said rotatable member for actuating said valve in a service and a regeneration cycle, and means for reversing said rotatable member to reset the same with respect to said meter at the start of each regeneration.

9. In an automatic water softener, a water softener tank, a brine supply, a multiple port valve having a base with multiple ports therein and having pipes attached thereto, said pipes connecting said base, respectively, to a water supply, to the top and to the bottom of said softener tank, to service, to said brine supply and to drain, a multiple port lift turn valve member arranged when seated in its different positions on said base to direct a flow of water from said water supply pipe through said softener tank to service and said member in its other positions on said base arranged to direct a flow of water to backwash the material in said softener tank and to direct a flow of brine and wash water through said tank to drain, a cover attached to said base, a stem extending from said member through said cover, a motor attached to said multiple port valve and means driven by said motor cooperating with means attached to said stem for lifting, turning and reseating said member from one to another of its positions on said base, a water meter connected in said pipe from said water supply and electrical means between said meter and said motor for starting said motor when predetermined amounts of water have passed through said meter, to lift, turn, and reseat said member from one position on said base to another and means for stopping said motor.

LEE G. DANIELS.